United States Patent [19]

Oshima

[11] 4,364,455
[45] Dec. 21, 1982

[54] RETRACTION SPRING FOR DISC BRAKE PADS

[75] Inventor: Harumi Oshima, Kawasaki, Japan

[73] Assignee: Tokico Ltd., Kawasaki, Japan

[21] Appl. No.: 342,919

[22] Filed: Jan. 26, 1982

Related U.S. Application Data

[63] Continuation of Ser. No. 158,386, Jun. 11, 1980, abandoned.

[30] Foreign Application Priority Data

Jun. 20, 1979 [JP] Japan ................................ 54-84689
Jun. 20, 1979 [JP] Japan ................................ 54-84691

[51] Int. Cl.³ .................................... F16D 55/224
[52] U.S. Cl. ............................ 188/1.11; 188/72.3
[58] Field of Search .......... 188/1.11, 72.3, 73.31, 188/73.35, 73.36, 73.37, 73.38, 216

[56] References Cited

U.S. PATENT DOCUMENTS

| | | | |
|---|---|---|---|
| 2,621,761 | 12/1952 | Smith | 188/216 |
| 2,973,837 | 3/1961 | Wilson | 188/216 X |
| 3,044,579 | 7/1962 | Klaue | 188/72.3 X |
| 3,500,966 | 3/1970 | Birge | 188/216 X |
| 3,669,232 | 6/1972 | Rohweder et al. | 188/72.3 X |
| 4,034,857 | 7/1977 | Kondo et al. | 188/73.36 |
| 4,222,463 | 9/1980 | Domes et al. | 188/72.3 |
| 4,245,723 | 1/1981 | Moriya | 188/72.3 |

FOREIGN PATENT DOCUMENTS 2538475 3/1977 Fed. Rep. of Germany ..... 188/1.11
997123 6/1965 United Kingdom ............... 188/72.3

*Primary Examiner*—Douglas C. Butler
*Assistant Examiner*—R. R. Diefendorf
*Attorney, Agent, or Firm*—Wenderoth, Lind & Ponack

[57] ABSTRACT

A disc brake including a friction pad disposed on one surface of a rotatable disc and a stationary member displaceably supporting thereon the friction pad. A resilient member is provided between the stationary member and the friction pad for biasing the friction pad in the direction separating from the disc when the friction pad has been urged against the disc in applying the brake.

2 Claims, 12 Drawing Figures

U.S. Patent   Dec. 21, 1982   Sheet 1 of 3   4,364,455
Fig. 1
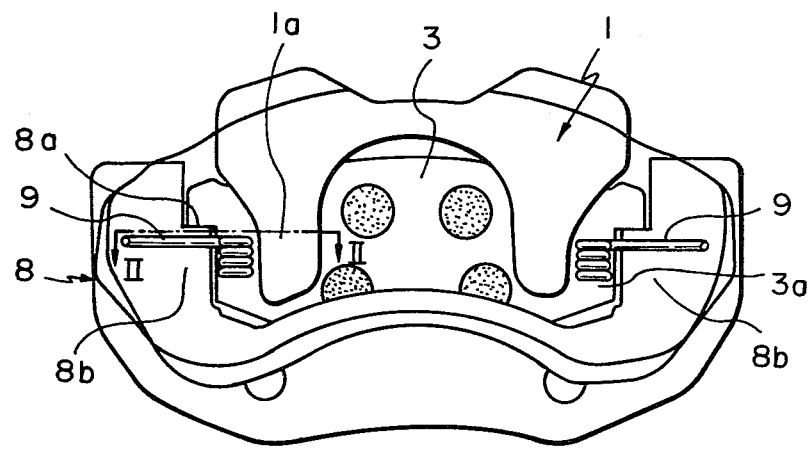
Fig. 2
Fig. 3
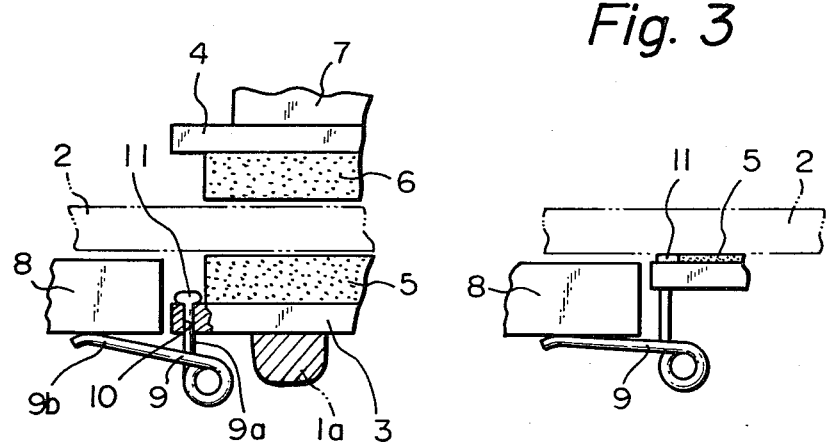

Fig. 8
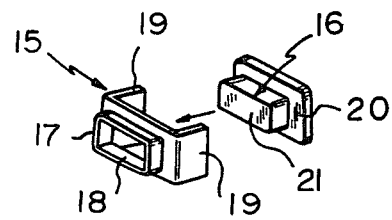
Fig. 9a   Fig. 9b   Fig. 9c
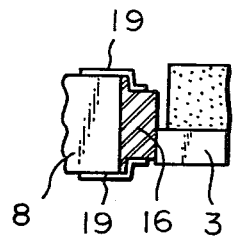 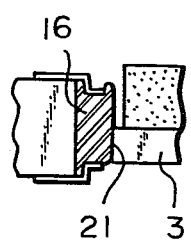 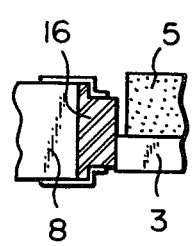
Fig. 10
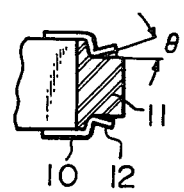

RETRACTION SPRING FOR DISC BRAKE PADS

This application is a continuation of application Ser. No. 158,386, filed June 11, 1980, now abandoned.

BACKGROUND OF THE INVENTION

This invention relates to improvements in disc brakes. Conventional disc brakes comprise a pair of friction pads disposed on opposite sides of a rotatable disc and, in applying the brake, the friction pads are displaced toward the disc to clamp the disc therebetween. However, the friction pads are not displaced to any substantial degree during application of the brake and during release of the brake, and thus, the friction pads continuously contact the disc, thereby increasing the wear and causing the so-called dragging phenomenon.

SUMMARY OF THE INVENTION

It is therefore an object of the invention to provide a disc brake wherein at least one of the friction pads is forcibly separated from the disc by a resilient member at the time of release of the brake, thereby overcoming the shortcomings aforementioned. The resilient member may comprise a torsion coil spring or a leaf spring one end of which is preferably secured to a backing plate of the friction pad. The other end of the spring may simply abut a stationary member.

The resilient member may be formed of a resilient material such as rubber or the like one end of which is mounted on the stationary member, and the other end of which contacts the side surface of the friction pad so that the resilient member is resiliently deformed when the friction pad is disposed toward the disc.

BRIEF DESCRIPTION OF THE DRAWINGS

The present invention will be further described in detail with reference to the accompanying drawings showing some embodiments of the invention, in which:

FIG. 1 is a front view of a disc brake according to the invention;

FIG. 2 is a partial sectional view taken generally along line II—II in FIG. 1;

FIG. 3 is an explanatory view showing the friction pad being worn.

FIG. 8 is an enlarged exploded view of the resilient member of FIG. 7;

FIGS. 9a, 9b and 9c are views showing the function of the resilient member; and

FIG. 10 is a view showing a modified form of the resilient member.

DETAILED DESCRIPTION OF THE PREFERRED EMBODIMENTS

Figure 5:
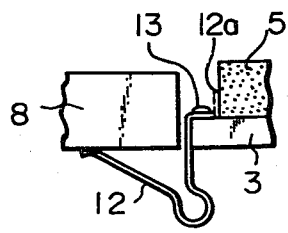
FIGS. 4 and 5 are partial views showing respectively modified forms of the spring according to the invention.

The disc brake illustrated in FIG. 1 comprises a floating type caliper 1, and a stationary member or a carrier 8 which is adapted to be secured to a non-rotatable part of a vehicle. The disc brake further comprises friction pads 5 and 6 (FIG. 2) respectively having backing plates 3 and 4. The friction pads 5 and 6 are disposed on opposite sides of a rotatable disc 2. The caliper 1 has a limb portion 1a which straddles a portion of the circumference of the disc 2 to extend to the rear surface of the backing plate 3 of the friction pad 5. Another limb portion of the caliper 1 incorporates a cylinder (not shown) slidably receiving therein a piston 7 for engaging with the backing plate 4 of the friction pad 6. When the friction pad 6 is pressed by the piston 7 toward the disc 2, the caliper 1 is displaced by the reaction force, whereby the friction pad 5 is pressed against the disc 2 by the limb portion 1a of the caliper 1. The caliper 1 is supported on the carrier 8 by means of a pair of pins (not shown) so as to slide in the direction of the axis of the disc 2.

The backing plate 3 of the friction pad 5 is supported on a pair of circumferentially spaced and radially outwardly facing shoulders 8a of the carrier 8, and is displaceable in the direction of the axis of the disc 2 or in the direction perpendicular to the plane of FIG. 1.

According to the invention, there are provided between the backing plate 3 of the friction pad 5 and the carrier 8 coil springs 9. As shown in FIG. 2, one end 9a of each coil spring 9 passes through a hole 10 formed in the backing plate 3 in the direction approaching the disc 2, and is secured to the backing plate 3, for example forming a head 11. The other end 9b of the spring 9 abuts the carrier 8.

In applying the brake, hydraulic oil under pressure is supplied to the cylinder to displace the piston 7 downward in FIG. 2, thereby pressing the friction pad 6 against the disc 2. The caliper 1 is displaced upward as viewed in FIG. 2, thereby displacing the friction pad 5 upward against the disc 2. The coil spring 9 is twisted, thereby storing therein a torsional force. When the hydraulic pressure is released, the spring 9 acts to separate the friction pad 5 from the disc 2. Preferably, the spring 9 is formed so as to have a low spring constant so that the torsional force of the spring 9 will not change much even though the amount of the displacement of the friction pad 5 changes in accordance with the wear thereof. The spring 9 may be formed so as to plastically deform when the resilient deformation of the spring exceeds a predetermined amount so that the resilient force of the spring for separating the friction pad from the disc 2 after release of the brake applying force does not increase very much during the service life of the friction pad. The torsional force of the spring 9 is preferably larger than the sliding resistance of the backing plate 3 sliding on the carrier 8 and is smaller than the sliding resistance of the piston 7 sliding in the cylinder.

In the embodiment shown in FIG. 2, the spring 9 secured to the backing plate 3 of the friction pad 5 has the headed end 11 which projects from the backing plate 3 a predetermined distance toward the disc 2, and thus, as shown in FIG. 3, when the friction pad 5 has worn, the caulked end 11 contacts the surface of the disc, thereby generating metal contacting sounds or vibration sounds which effectively act as a warning signal to the driver of the vehicle.

Figure 4:
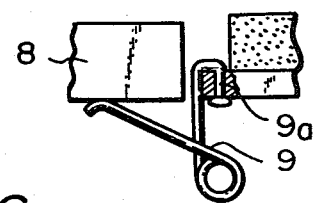

FIG. 4 shows a modified form, wherein the end portion 9a of the spring 9 is bent into a generally U-shaped form and is passed through the backing plate in the direction away from the disc.

The embodiment shown in FIG. 5 utilizes a leaf spring 12. One end of the leaf spring 12 is secured to the backing plate 3 by a rivet 13. To provide the wear warning function similar to the embodiment of FIG. 3, the rivet may be given a length sufficient to project from the backing plate; otherwise, the leaf spring 12 may be given a projecting end 12a as shown in phantom lines in FIG. 5.

In the embodiments of FIGS. 2-5, the spring simply abuts the side surface of the carrier 8; however, the one end of the spring may be secured to the carrier.

Figure 6:
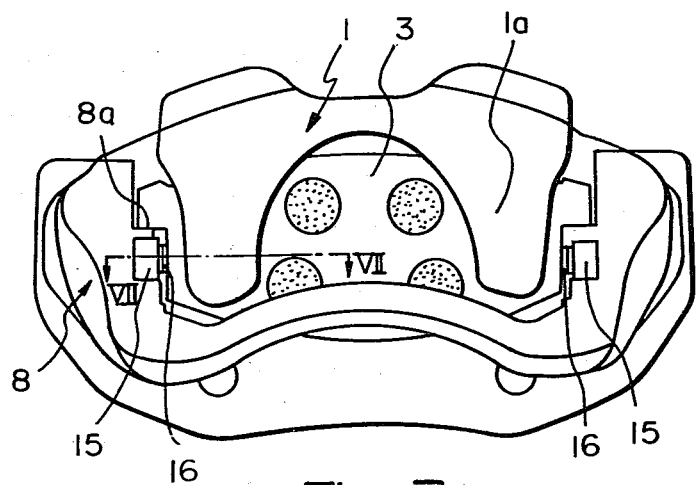
FIG. 6 is a view similar to FIG. 1 but showing another embodiment of the invention.
Figure 7:
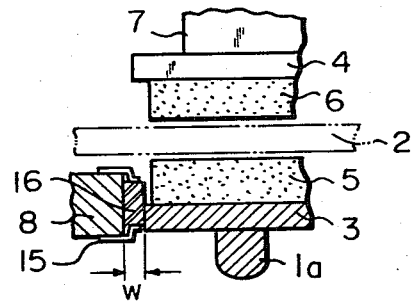
FIG. 7 is a partial sectional view taken generally along line VII—VII in FIG. 6.

Another embodiment of the invention is illustrated in FIGS. 6-8, in which a circumferential space or clearance w is formed between the backing plate 3 of the friction pad 5 and the carrier member 8 as shown in FIG. 7. A resilient member 16 formed of a resilient material such as rubber or the like is disposed in the space w and is retained in its position by a cover member 15. The cover member 15 comprises an encircling wall 17 defining therein an opening 18, and side walls 19 extending toward the carrier 8. The resilient member 16 includes a generally flat base portion 20, and projecting portion 21 which projects from the base portion 20 passing through the opening 18 of the cover member 15 and toward the backing plate 3. The resilient member 16 is mounted on the carrier 8 with the projecting portion 21 projecting through the opening 18 of the cover member 15 to engage with the backing plate 3, and the side walls 19 of the cover member 15 clamping the carrier 8 therebetween. In the embodiment, the side walls 19 of the cover member 15 resiliently engage with correspondingly shaped wall portions of the carrier 8; however, the cover member 15 may be secured to the carrier 8 by fasteners or the like.

In the non-actuated condition of the brake, the resilient member 16 lightly engages with the backing plate 3 as shown in FIG. 9a. Upon application of the brake, the backing plate 3 is displaced upwardly as viewed in FIG. 9b, whereby the projecting portion 21 of the resilient member 16 or at least a portion thereof is carried upwardly. And when the brake applying force is released, the resilient member 16 acts to retract the backing plate 3 to the original position as shown in FIG. 9c.

The retracting force acting on the friction pad 5 can be determined by the initial contacting pressure of the resilient member 16, and the configuration and arrangement of the resilient member 16 and the cover member 15. Preferably, the retracting force acting on the friction pad due to the resiliency of the resilient member 16 is larger than the resisting force acting on the backing plate during the sliding movement thereof on the carrier 8, and is smaller than the sliding resistance between the piston 7 and the cylinder.

In the embodiment shown in FIG. 10, the encircling wall 17 diverges in the backing plate 3 and toward the direction of the displacement of the backing plate 3 at an angle $\theta$, so that the resilient member 16 can easily deform during application of the brake.

In the embodiments described above, the backing plate 3 of the friction pad 5 is supported on shoulder portions 8a of the carrier 8; however, the friction pad 5 may be supported by a pair of circumferentially spaced and axially extending pins.

The invention has been applied to friction pad 5 which is indirectly applied to the disc; however, the invention can also be applied to the friction pad 6 which directly receives the force of the piston 7. It will be noted that the seal member provided between the piston 7 and the cylinder receiving the piston therein usually acts to positively retract the piston 7 when the hydraulic pressure applied on the piston is released; however, the amount of such retracting movement is relatively small, while, according to the invention, the friction pads can positively and distinctively be retracted from the disc when the brake applying force is released.

As described heretofore in detail, the disc brake according to the invention forcibly separates the friction pad from the disc upon the release of the hydraulic pressure. Thus, it is possible to minimize the wear of the friction pad and to minimize the braking force remaining in the pressure released condition.

What is claimed is:

1. A disc brake comprising: a pair of friction pads on opposite sides of a rotatable disc and each having a backing plate and a pad of friction material on said backing plate and facing the disc; a stationary member supporting the backing plates thereon for displacement toward and away from the disc, said stationary member being adapted to be secured to a nonrotatable part of a vehicle on one side of the disc and having limb portions straddling the disc and extending the other side of the disc, said limb portions respectively having surfaces facing away from the rotatable disc and generally parallel with the surface of the disc; a caliper floatingly mounted on the stationary member and incorporating therein means for pressing one backing plate toward the disc for pressing the friction pad thereon directly against one side of the disc, said caliper having a limb portion straddling the circumference of the disc and engaged with the backing plate for the other friction pad for pressing the other friction pad against the other side of the disc; and a pair of springs secured to the backing plate of the other friction pad and abutting said surfaces on said limb portions of said stationary member, respectively, for urging said backing plate of the other friction pad and the caliper away from the disc, each of said springs having generally straight end portions extending from a resilient central loop portion, one end portion extending in the direction of the axis of the disc and being secured to the backing plate of said other friction pad for securing the corresponding spring to the backing plate, and the other end portion extending angularly with respect to the axis of the disc and circumferentially of the disc from said loop portion to said surface on the corresponding limb portion of the stationary member.

2. A disc brake according to claim 1 wherein said one end of the spring extends from the backing plate toward the disc a predetermined amount, whereby when the friction pad wears, said one end will act as a friction pad wear indicator.

* * * * *